United States Patent [19]

Martin

[11] 4,339,263
[45] Jul. 13, 1982

[54] GOB FEEDER CHUTES FOR GLASS MOLDING MACHINES

[75] Inventor: John K. Martin, Monterrey, Mexico

[73] Assignee: Vitro Tec Fideicomiso, Monterrey, Mexico

[21] Appl. No.: 246,023

[22] Filed: Mar. 20, 1981

Related U.S. Application Data

[63] Continuation-in-part of Ser. No. 96,045, Nov. 20, 1979, abandoned.

[51] Int. Cl.³ .............................................. C03B 7/16
[52] U.S. Cl. ...................................... 65/225; 65/303; 65/304

[58] Field of Search ................. 65/324, 325, 225, 303, 65/304

[56] References Cited

U.S. PATENT DOCUMENTS 2,020,623  11/1935  Stenhouse ......................... 65/225 X
2,836,934  6/1958  McLaughlin et al. ............ 65/225 X Primary Examiner—Arthur D. Kellogg
Attorney, Agent, or Firm—Kemon & Estabrook

[57] ABSTRACT

A feeder chute for glass molding machines has a cross section defined by an even number, preferably four of equal length sides. Each side may be either plane or curved convexly inwardly in a horizontal plane.

5 Claims, 2 Drawing Figures

GOB FEEDER CHUTES FOR GLASS MOLDING MACHINES

BACKGROUND OF THE INVENTION

This is a continuation in part of my earlier application Ser. No. 096,045, filed Nov. 20, 1979 now abandoned.

In modern high speed glass molding machinery for example, as disclosed in my prior U.S. Pat. No. 4,200,449, molten gobs of glass are sheared off in a gob feeder and allowed to fall by gravity through a system of chutes to the molds where they are shaped into a final product. While the aforementioned patent is directed to a so called paste mold machine, the present invention is applicable to glass molding machines generally wherever the molds are fed by a closed chute which extends between the gob feeder and the molds. Such chutes in machines in the prior art conventionally include a first inclined portion U-shaped in cross section which receives the severed gob and delivers it to a second inclined portion also U-shaped but with the open side of the U facing in the opposite direction. The second U-shaped portion delivers the gob to a third vertically arranged portion which in the machines of the prior art is usually round or also U-shaped and positioned to deliver the gob to the mold proper. Even if the chutes are stationary during passage of a gob therethrough, the gob inevitably makes contact with the walls of the vertical portion of the chutes and this leads to what is known in the trade as "brush marks" in the finished ware. The gob is falling through the vertical portion of the chute and particularly where such portion has a closed cross section, must push the air in the chute ahead of it. The net effect may be compared with a piston in a cylinder such as a shock absorber because pushing of the air through the closed chute slows the passage of the gob through the chute as compared to what the travel time would be in an unconfined space. Since the "name of the game" in glass molding machinery is maximum speed commensurate with quality of the product produced, anything which can be done to speed the travel of the molten gob between the gob feeder and the mold will result in an increase in operating speed of the machine.

BRIEF SUMMARY OF THE INVENTION

The applicant herein has discovered that the problems of brush marks in the finished ware and the slowing of the falling gob in the vertical portion of the chute can both be avoided by a simple alteration of the cross section of the vertical portion of the chutes. Specifically, it has been found that if the side walls of the vertical section chutes are of equal length, equal in number, preferably four, that the molten glass gobs inherently center themselves in the chutes and pass therethrough without significant contact with the walls. As a result of empirical testing, applicant has further discovered that the ideal situation is one in which the cross sectional area of the falling gob is substantially equal to, the cross sectional area of the interior of the chute minus the cross sectional area of the gob itself.

DETAILED DESCRIPTION OF THE DRAWINGS

Figure 1:
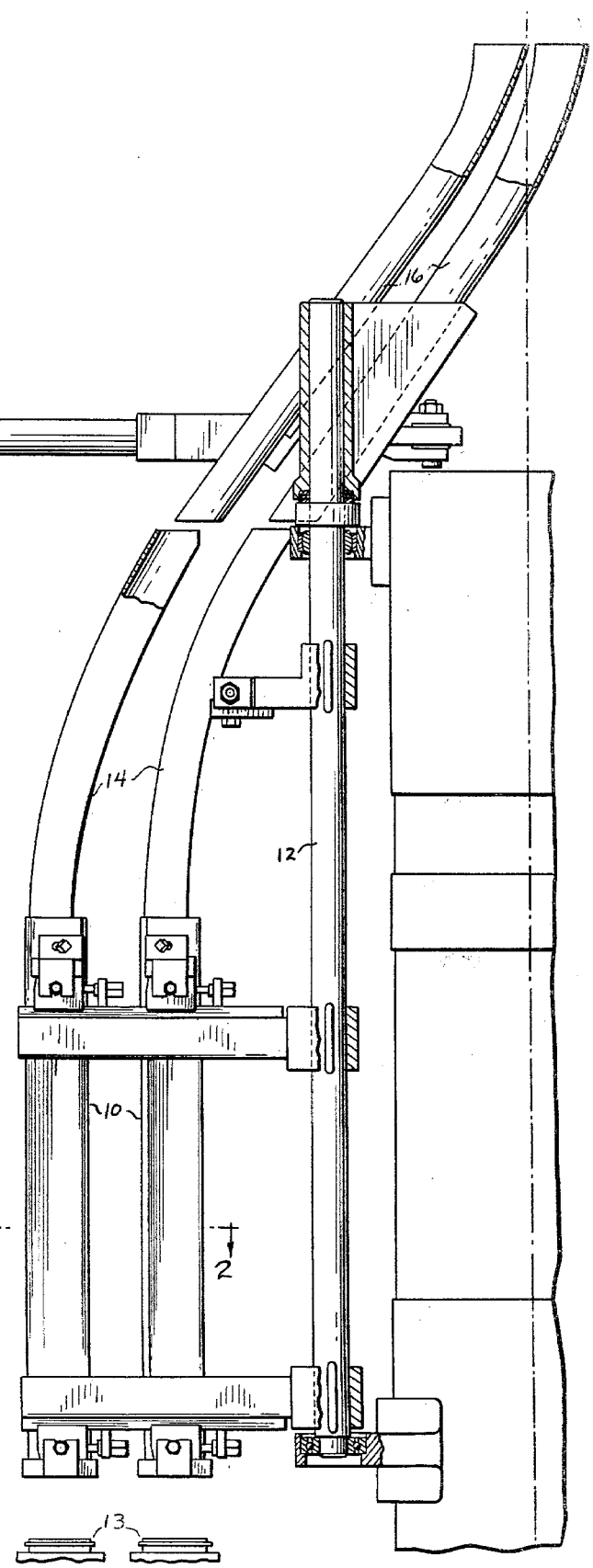
FIG. 1 is a side elevation partially in section of a feeder chute assembly for an automatic glass blow molding machine.
Figure 2:
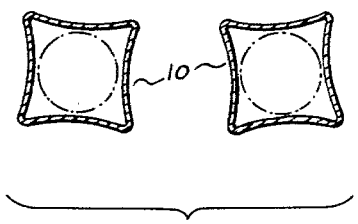
FIG. 2 is a cross section of the vertical portion of the chutes on the lines 2—2 of FIG. 1.

FIG. 1 of the drawing shows a pair of vertical closed wall feed chutes 10 supported on a shaft 12 which permits them to be moved into and out of alignment with the neck rings 13 and molds in a blow molding machine. This drawing corresponds to FIG. 3 of my prior U.S. Pat. No. 4,200,449. The chutes 10 are fed from a gob feeder not shown, via a pair of channel shaped chutes 14 and 16 the open sides of which face in opposite directions. As shown in FIG. 2, the side walls 18 of the chutes 10 are inwardly curved but this is not essential to practice of the invention. Such curvature merely permits adaptation of a chute with straight side walls to the handling of smaller sized gobs of glass. The glass gobs are indicated by the dotted line circles in this Figure in substantially the position which it has been found they will automatically occupy with respect to the inner surface of the walls 18 as they pass through the chutes 10. As will be seen in this Figure, such position is one in which the gob in each instance is spaced substantially equidistantly from each of the four inner surfaces of the chute.

Reverting for a moment to the situation of a gob falling through a chute of circular cross section, it can be clearly demonstrated that with a circular cross section chute the gob makes substantial contact with the inner surfaces of the chute and further that it pushes substantially all of the air in the chute ahead of it during its passage through the chute. By using a "lazy" gas flame at the bottom of a circular chute, it can be shown that this is the fact because the flame will be extinguished every time.

Turning to the chute of substantially square cross section as shown in FIG. 2, the exact reason for the automatic symmetrical positioning of the gob within the chute is not entirely understood. Again applying the lazy gas flame test at the bottom of the tube, it can be conclusively demonstrated that in the case of a tube of square cross section, whether the side walls are plane or inwardly curved as shown in FIG. 2, that the gas flame is blown but not extinguished. This then gives rise to two possible explanations which are offered here by way of theory and not by way of limitation. The first of these is simply that the gob in falling through a chute as shown in FIG. 2 no longer pushes all of the air ahead of it through the chute but only a portion and what is not pushed ahead of the gob either flows upwardly around the gob in each corner of the chute or it remains substantially stationary in the corners. It seams more plausible that there is an upward flow in the corners of the chutes which creates forces which are equal and opposite on opposite sides of the gob and therefore tends to center it as shown in this Figure. Another possible explanation is that a partial vacuum is created by the gob falling through the chute and the air not moved downwardly ahead of the gob is sucked upwardly due to this partial vacuum. Regardless of the technical reasons, it has been definitely established that little or no contact occurs when the chute has a cross section which is a substantially regular polygon having a even number of sides preferably equal to four. Referring again to the speed of travel of the gobs through the closed chute, as pointed out above, the fall of the gob through a square chute is measurably faster than the fall of the gob through a circular chute because of the lack of contact between the gob and the inner surfaces of the square chute. Further empirical testing has proven that the ideal situation is one in which the size of the gob is so related to the size of the chute that the cross sectional area of the gob is substantially equal to the cross sectional area of the space between the gob and the inner surfaces of the chute. Stated otherwise, the cross sectional area of the chute is preferably substantially twice the cross sectional area of the gob falling through the chute. This preferred situation results in maximum speed of travel of the gob through the chute combined with symmetrical positioning of the gob in spaced relation to the inner walls of the chute.

While preferred embodiments of the present invention have been herein shown and described, applicant claims the benefit of a full range of equivalents within the scope of the appended claims.

I claim:

1. In combination with an automatic glass molding machine, a vertically arranged closed wall chute for guiding molten glass gobs from an automatic gob feeder to the glass molds while preventing contact between the gobs and the inner walls of the chute, said chute comprising:

an elongated closed wall tube having a non-circular cross section which is a substantially regular polygon having an even number of sides at least equal to four, the smallest cross section dimension of said tube being greater than the cross section dimension of the gob, and the included interior angle of each corner of the polygon being sufficiently small to define substantial air passageways between the gob and the corners of the chutes, the movement of air through said passageways incident to falling of the gob through the chute being effective to center the gob and space it equidistantly from the chute walls.

2. The combination defined by claim 1 in which the number of sides is four.

3. The combination defined by claim 1 in which each side is horizontally convexly inwardly curved.

4. The combination defined by claim 2 in which each side is convexly inwardly curved.

5. The combination defined by any one of claims 1–4 in which cross sectional area of the chute is substantially twice the cross sectional area of the gob.

* * * * *